US012771034B1

(12) United States Patent
Hristov et al.

(10) Patent No.: US 12,771,034 B1
(45) Date of Patent: Oct. 20, 2026

(54) STRUCTURAL ANTENNA COMPONENT

(71) Applicants: Stoyan Hristov, Gilroy, CA (US); Ugur Olgun, Marina Del Rey, CA (US); Chukwubuikem Marcel Okoli, Los Angeles, CA (US)

(72) Inventors: Stoyan Hristov, Gilroy, CA (US); Ugur Olgun, Marina Del Rey, CA (US); Chukwubuikem Marcel Okoli, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 546 days.

(21) Appl. No.: 18/206,939

(22) Filed: Jun. 7, 2023

(51) Int. Cl.
*H01Q 9/14* (2006.01)
*H01Q 1/24* (2006.01)
*H01Q 1/44* (2006.01)
*H01Q 5/30* (2015.01)

(52) U.S. Cl.
CPC ................. *H01Q 9/14* (2013.01); *H01Q 1/24* (2013.01); *H01Q 1/44* (2013.01); *H01Q 5/30* (2015.01)

(58) Field of Classification Search
CPC ............... H01Q 1/24–245; H01Q 1/44; H01Q 9/14–145; H01Q 5/00–55
See application file for complete search history.

(56) References Cited

U.S. PATENT DOCUMENTS 5,880,697 A * 3/1999 McCarrick ............. H01Q 1/286 343/702
2001/0043158 A1* 11/2001 Adachi ................ H01Q 9/0485 343/700 MS
2004/0140933 A1* 7/2004 Shikata ................ H01Q 9/0442 343/700 MS
2006/0001580 A1* 1/2006 Usui ...................... H01Q 1/243 343/702
2007/0279884 A1* 12/2007 Hardt ................... H05K 7/1487 361/796
2008/0165067 A1* 7/2008 Kim ....................... H01Q 1/242 343/702
2009/0033568 A1* 2/2009 Hung ..................... H01Q 1/243 343/702
2010/0149041 A1* 6/2010 Asraff .................... H01Q 1/243 343/700 MS (Continued)

FOREIGN PATENT DOCUMENTS

CN 109119748 A * 1/2019 ............... H01Q 1/36
KR 20080017857 A * 2/2008 ............. H01Q 1/243

*Primary Examiner* — Ab Salam Alkassim, Jr.
(74) *Attorney, Agent, or Firm* — CM Law; Stephen J. Weed

(57) ABSTRACT

A device having a riser forming both a structural component and a component of a multiband antenna, and an extension. The riser functions as a radiating leg of the multiband antenna and provides structural integrity to the device. The riser and extension each have a respective adjustable fastener, such as a screw, having a selectable length L extending from the respective riser and extension. The riser and extension, and the respective fasteners form legs of the antenna. The length of the riser and extension, and the length L of the fasteners together form legs each generating a radiated frequency. The fasteners are selectively adjustable to tune and establish the respective radiated frequency. In an example, at least four different radiated frequencies are generated by the multiband antenna, where at least two of the frequencies are adjustable.

17 Claims, 6 Drawing Sheets

(56) References Cited

U.S. PATENT DOCUMENTS

| | | | | |
|---|---|---|---|---|
| 2013/0109329 | A1* | 5/2013 | Na | H01Q 1/243<br>455/73 |
| 2013/0335911 | A1* | 12/2013 | Pang | G06F 1/185<br>361/679.32 |
| 2019/0033622 | A1* | 1/2019 | Olgun | G02C 11/10 |
| 2019/0229395 | A1* | 7/2019 | Hintermann | G02C 11/10 |
| 2020/0119433 | A1* | 4/2020 | Ashwood | H01Q 1/273 |
| 2020/0293850 | A1* | 9/2020 | Grove | G06K 19/07771 |
| 2021/0288407 | A1* | 9/2021 | Contal | H01Q 1/44 |
| 2021/0384933 | A1* | 12/2021 | Olgun | H01Q 1/273 |
| 2022/0285846 | A1* | 9/2022 | Sano | H01Q 1/1207 |
| 2022/0416423 | A1* | 12/2022 | Kim | H01Q 1/36 |
| 2023/0006351 | A1* | 1/2023 | Olgun | H01Q 1/44 |
| 2023/0103941 | A1* | 4/2023 | Tsorng | H05K 7/1487<br>361/679.01 |
| 2024/0063530 | A1* | 2/2024 | Olgun | H01Q 1/241 |
| 2024/0145927 | A1* | 5/2024 | Olgun | H01Q 1/44 |
| 2025/0385431 | A1* | 12/2025 | Cheng | H01Q 9/16 |

* cited by examiner

STRUCTURAL ANTENNA COMPONENT

TECHNICAL FIELD

Examples set forth in the present disclosure relate to the field of multiband antennas.

BACKGROUND

A multiband antenna enables data transmission over multiple frequencies, which in turn enables increased data throughput. A highly efficient radiator allows significantly enhanced communication range and reduces the overall energy consumption.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
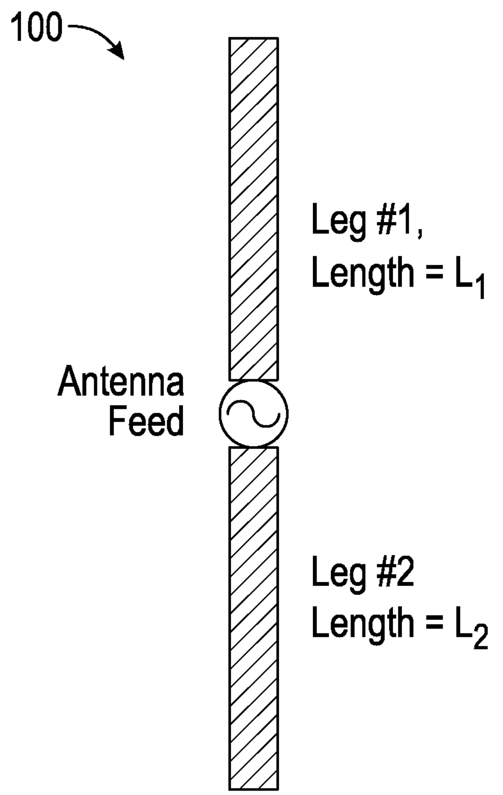
FIG. 1 (Prior Art)
FIG. 1 is an illustration depicting a common dipole antenna.

A device having a riser forming both a structural component and a component of a multiband antenna, and an extension. The riser functions as a radiating leg of the multiband antenna and provides structural integrity to the device. The riser and extension each have a respective adjustable fastener, such as a screw, having a selectable length L extending from the respective riser and extension. The riser and extension, and the respective fasteners form legs of the antenna. The length of the riser and extension, and the length L of the fasteners together form legs each generating a radiated frequency. The fasteners are selectively adjustable to tune and establish the respective radiated frequency. In an example, at least four different radiated frequencies are generated by the multiband antenna, where at least two of the frequencies are adjustable.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Efficient and multiband antenna radiation in the smallest physical volume possible is a strong desire for any wireless communication application. A highly efficient radiator allows significantly enhanced communication range and reduces the overall energy consumption. A multiband antenna enables data transmission over multiple frequencies, which in turn enables increased data throughput. In many new consumer electronics devices, however, the antenna design is compromised in favor of fashion and style and typically provided with electrically very small volume. In examples described herein, existing metal in the device is used for multiple purposes in order to avoid poor efficiency and complicated RF front ends to meet radiation specifications.

Frequently, descendants of one of the two fundamental antenna types are employed in consumer electronic devices, loop antennas or dipole/monopole antennas. The dipole antenna, which is the most common, is depicted at 100 in FIG. 1 in its ideal form. Dipole antennas are called "electric type" antennas since their main radiating mode is $TM_{10}$, which means that the antenna generates electric fields that are orthogonal to the direction of propagation. In FIG. 1, the sum of the lengths of antenna Leg 1 and Leg 2, $l_1$ and $l_2$ (i.e., total length), determines a first resonant frequency of the dipole antenna 100 where it supports the $TM_{10}$ mode. The ratio of lengths of $l_1$ to $l_2$ determines the input impedance of the dipole antenna 100 at that resonant frequency. As a way of example, a self-resonant, $TM_{10}$ supporting dipole antenna 100 in air designed for a 1.575 GHz frequency GNSS operation would need $l_1=l_2=\sim4.56$ cm. This length is too long in a wearable consumer electronics device, such as a smart eyewear device, to be just dedicated to the antenna element itself.

Figure 2:
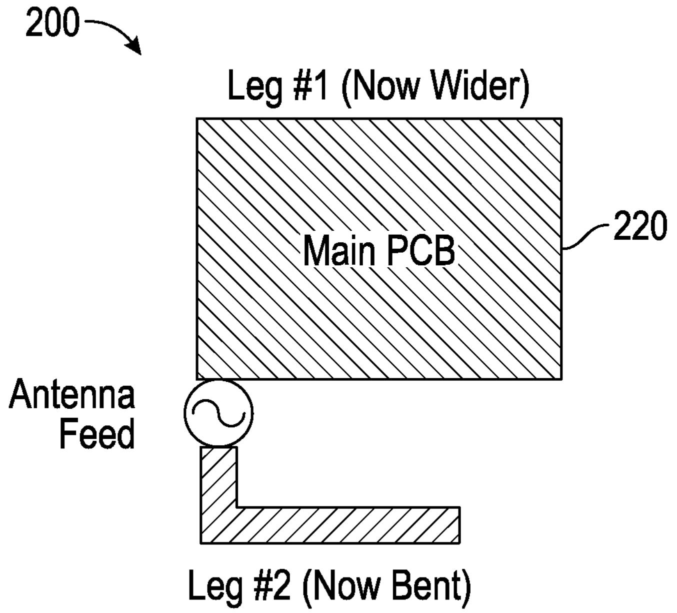
FIG. 2 (Prior Art)
FIG. 2 is an illustration depicting a dipole antenna including a main printed circuit board (PCB) forming one of the legs of the dipole antenna.

Typically, a dipole antenna is incorporated into a consumer electronics device by the method shown as dipole antenna 200 in FIG. 2. The first antenna Leg 1 is widened and reuses an existing main PCB 220 in the device. The second antenna Leg 2 is typically bent to save space while keeping the leg length the same. One or both of Leg 1 and Leg 2 could be encapsulated in a low loss dielectric material to further reduce the length needed for the dipole antenna to operate, a technique called dielectric loading.

Figure 3:
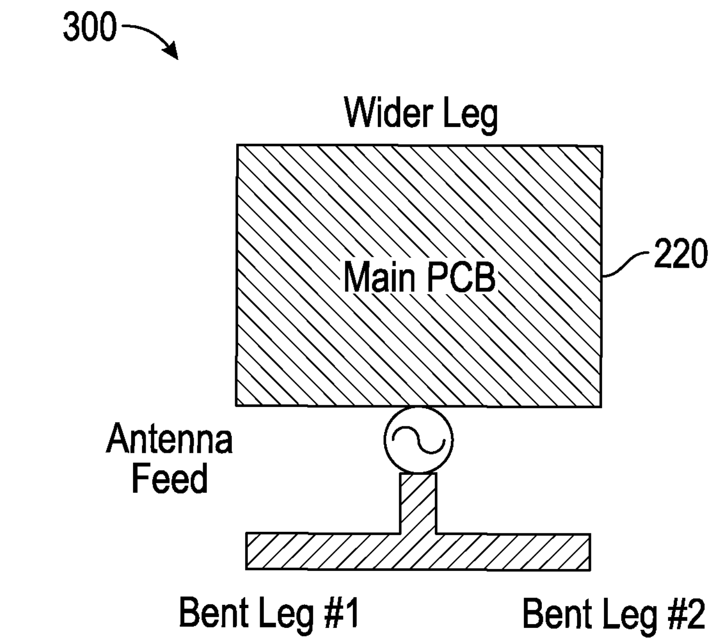
FIG. 3 (Prior Art)
FIG. 3 is an illustration depicting a dual-inverted L antenna (DILA) with two bent legs and a main PCB.

The antenna design technique shown as dipole antenna 200 in FIG. 2 is the basic building block for many of the antenna architectures found in consumer electronics devices since the early 1990s. This antenna design is called an Inverted L antenna (ILA), as it looks like an L, that is rotated and sits above the main PCB 220. Many consumer electronics devices incorporating the ILA design added additional legs to the antenna, as shown as dipole antenna 300 in FIG. 3. The electrical length of each Leg 1 and Leg 2 is tuned to operate at a specific frequency band. The total length of both Leg 1 and Leg 2 together is also relevant as it provides another radiation mode, called the common mode. As such, with an antenna design shown as dipole antenna 300 in FIG. 3, it is technically possible to operate in 3 distinct frequency bands, where the length of each Leg 1 and Leg 2 determining a frequency band of operation (frequency f1 and frequency f2) and their total length determining another (frequency f3). Naturally, f3 is a lower frequency compared to f1 and f2. This is commonly done in many consumer electronics devices on the market today to achieve low-cost multiband operation.

Figure 4:
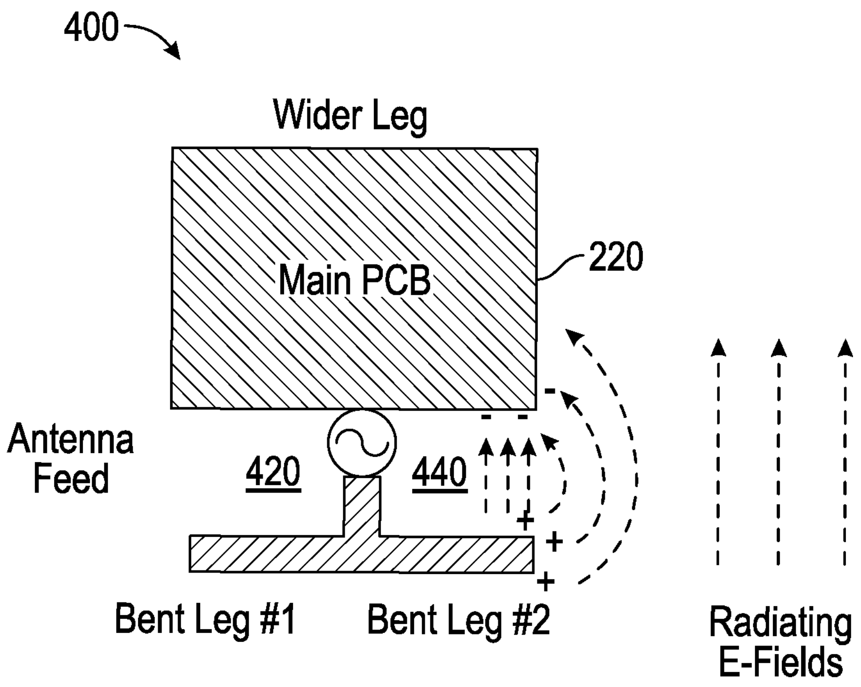
FIG. 4 (Prior Art)
FIG. 4 is an illustration depicting E-fields generated by the DILA of FIG. 3.

In many consumer electronics applications, the main antenna performance benchmark is radiation efficiency. Another benchmark, SAR (specific absorption rate), plays a notable role in antenna design. SAR is a regulatory compliance metric that measures how much of the radiating energy by the antenna is absorbed by the human tissue, at a specific volume. There are strict requirements on SAR performance for consumer electronics. SAR performance is determined by how much power the antenna is radiating and how it is radiating it. The lower energy antenna radiates, or the lower field concentration an antenna has, the better SAR performance it will have. From an engineering perspective, the antenna radiation efficiency is the primary metric and as such, it is desired to radiate as much power as possible made available by the RF (radio frequency) front end as efficiently as possible, which contrasts with the SAR objectives. Looking at the radiation mechanism of a dual ILA (DILA) dipole antenna 400 as shown in FIG. 4, this dipole antenna 400 illustrates some of the challenges this antenna has with respect to SAR compliance.

The tip of the legs of the dipole antenna 400 will accumulate positive (or negative depending on the phase) charges in the frequency of operation. These charges are neutralized by opposing charges on the opposite leg, in this case the wider leg (e.g., Main PCB 220). An E-field will be generated as a result of these opposing charges over an aperture 420 and aperture 440 in between the two metal pieces forming the legs. At the edge of the antenna, these E-fields will begin to change shape as shown by dashed lines shown in FIG. 4 and as they progress further away from the dipole antenna 400, they will become untethered from the dipole antenna 400 itself and start radiating into the air. The E-fields are particularly strong at the tip of the dipole antenna 400 as that is where most charge accumulates. These E-fields are very effective in maximizing the antenna radiation efficiency, however, they also are SAR hotspots as the energy is concentrated at a specific location. Antenna engineers use various techniques to overcome this problem, like on smartphones using antenna switching. When hand holding a smartphone, the antenna at the top of the device (furthest from the hand) could be activated, and when the device is held against the head, the antenna at the bottom of the device (furthest from the head) can be activated. This is an expensive solution but effective. On less complicated devices, such as cellular mobile hotspots, the RF output power is cut back when proximity to tissue is detected. This is a compromise but allows for these devices to be compliant with the regulatory framework.

Eyewear Devices

Eye-wearable devices are different in their mechanical construction than most consumer electronics devices in the market. Typically, a bucket approach is used in assembling a majority of the smart electronic devices available for consumers today. This includes devices such as phones, watches, speakers, even thermostats. In most cases, a plastic or metal housing would form the bucket, then the battery and main PCB would go inside this bucket, and in the end the bucket would be capped off with a display. It is relatively straightforward to implement the antenna architecture shown in FIG. 2 with such a mechanical architecture, by relying on the main PCB 220 for efficient radiation and placing the bent antenna Leg 2 on one of the opposing edges.

However, for eye-wearable devices, this mechanical architecture is not necessarily feasible. The displays are optically transparent and designed to be in front of the wearer's eyes. As such, batteries and PCBs cannot be stacked with the display. As these eye-wearable devices are also fashion accessories, the battery and the main boards cannot be easily co-located, as the space needed would be too wide, or too thick. Typically, the main PCB 220 with critical electrical components, such as system on a chip (SOC) or a Wireless RF Front End, reside on narrow but longer PCBs 220 on the temples.

Temples are eyeglass components which assist in holding the eyeglasses on the face. Temples are the arms that reach from the frame of the eyeglasses and hook around the user's ears. In augmented reality devices, the temples may be used to house other electronic components, like antenna elements. These components are typically covered and protected by caps at the end of the assembly process.

This disclosure utilizes an antenna riser to provide a structural assembly component and to provide an efficient way to create an antenna architecture where the riser forms at least one leg of an antenna, which has additional structural benefits. This antenna riser geometry already takes up space to create separation between antenna traces and nearby metal components. The riser is structurally attached to the temple and is used for fastening nearby enclosure components to improve the enclosure integrity. The riser has an adjustable portion that allows the resonant frequency of a respective radiated signal to be tuned and adjusted. In an example, multiple risers are used to generate multiple resonant frequencies. As an example, rotatable screws are driven through an enclosure cap and into the antenna risers to fasten the cap at one or more temple ends. Screws or other fasteners can present challenges for the antenna architecture, so they are carefully considered during the design process.

Figure 5:
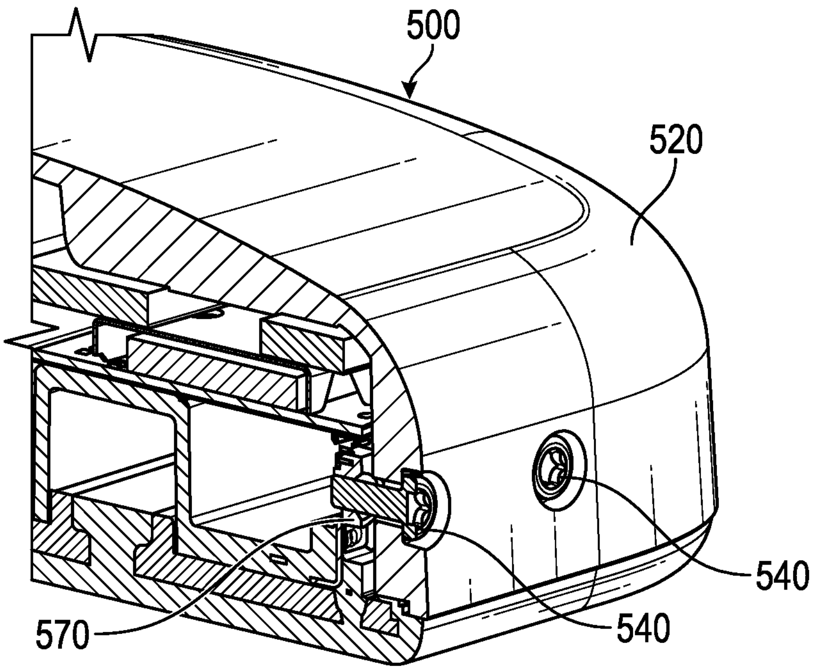
FIG. 5 is a cutaway perspective view of an eyewear temple having an enclosure cap.

FIG. 5 illustrates a perspective view of a temple 500 having an enclosure cap 520 selectively secured by adjustable fasteners 540. In an example, the fasteners 540 are screws, but can be other adjustable fasteners, each having an adjustable length L with respect to a respective first metal tab 560 and a second metal tab 570.

Figure 6:
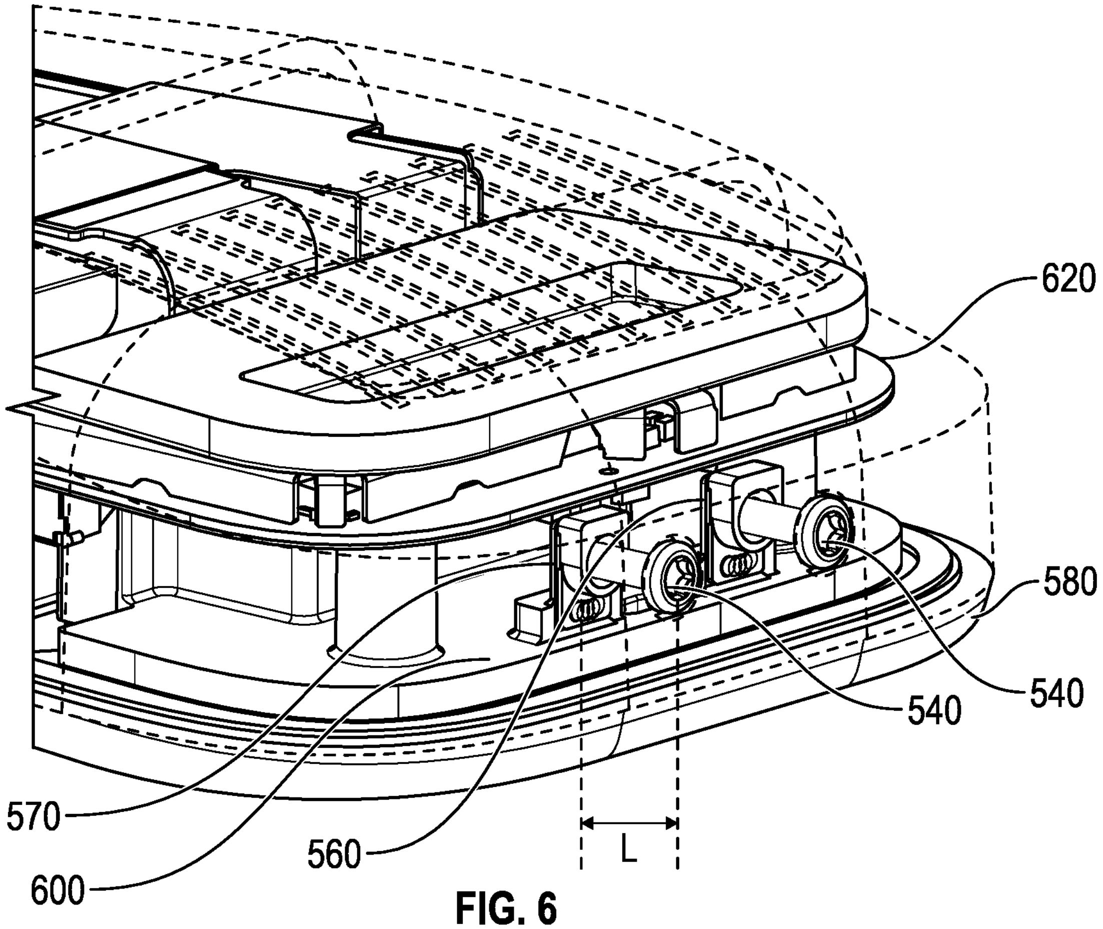
FIG. 6 is a partially transparent perspective view of the temple with the enclosure cap removed that illustrates a riser and an extension.
Figure 8:
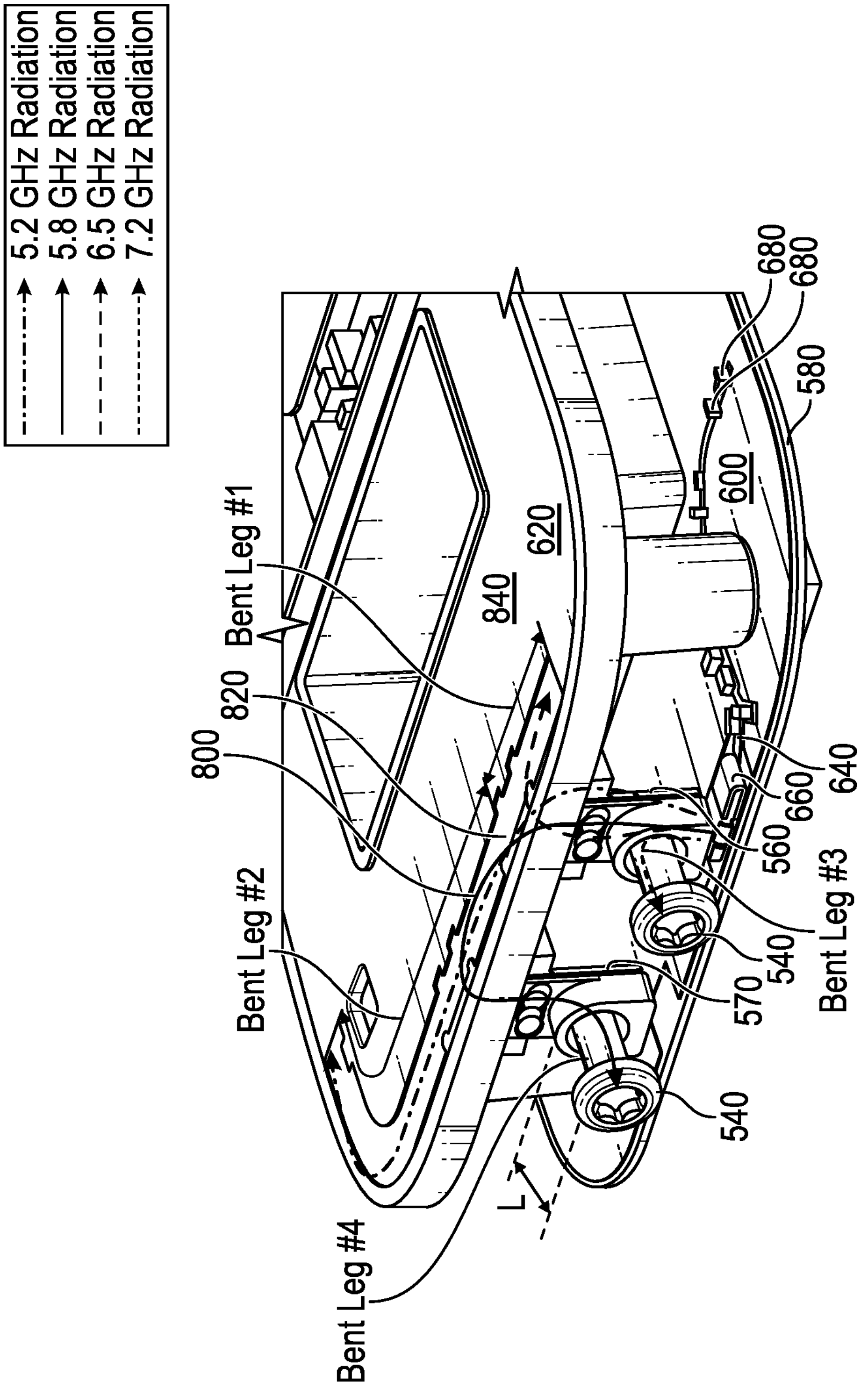
FIG. 8 is a perspective view of a multiband antenna formed by various features of the temple including the riser, the extension, and fasteners.

FIG. 6 illustrates a perspective view of temple 500 with enclosure cap 520 removed and illustrating riser 600 vertically extending between and physically coupled to a lower member 580 and an upper board 620. Riser 600 is electrically non-conductive, such as plastic, and has a molded geometrical shape to space board 620 from metal tabs 560 and 570. Metal tab 560 is coupled to and supported by riser 600 and is electrically coupled to an antenna feed 640 via an antenna launch spring 660 (FIG. 8). Metal tab 560 receives a radio frequency (RF) feed signal from a transceiver (not shown) and is electrically coupled to antenna trace 820 extending on a top surface 840 of board 620 (FIG. 8). Metal tab 570 is also coupled to and supported by riser 600 and is electrically coupled at an upper end to antenna trace 820 extending on a top surface of board 620. Antenna feed 640 extending on a top surface of riser 600 includes parasitic components 680 as are customary in antennas. Fasteners 540 are rotatable such they each have a selectable respective length L extending from the respective metal tab 560 and metal tab 570 to the distal end of the fastener 540 having a screw head.

The selectable length L of the respective fastener 540 summed with the length of the portion of metal tab 560 extending between the fastener 540 and antenna feed 640 establishes the electrical length of the respective Leg 3 and thus the resonant frequency of a signal radiated by Leg 3. The length of metal tab 560, the portion of trace 820 extending between metal tabs 560 and 570, metal tab 570, and the selectable length L of the respective fastener 540 coupled to metal tab 570 establishes the electrical length of the respective Leg 4 and thus the resonant frequency of a signal radiated by Leg 4.

Figure 7:
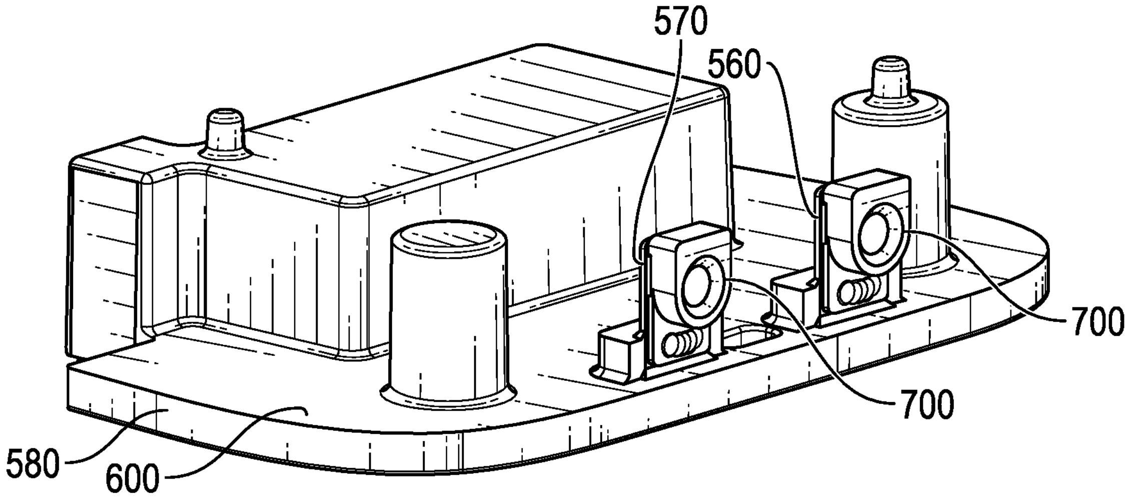
FIG. 7 is a perspective view of the riser and the extension, each having a respective screw boss rotatably receiving the respective fastener.

FIG. 7 illustrates metal tab 560 and metal tab 570 each having a respective screw boss 700 rotatably receiving the respective fastener 540. The respective fasteners 540 are rotatable such that length L of respective fastener 540 extending from respective screw boss 700 to a distal end of the respective fastener 540 is selectively adjustable. Screw boss 700 may have an insert molded tab. In one example, screw bosses 700 are welded to respective metal tab 560 metal tab 570. Fasteners 540 create some capacitance, and a bandpass filter is coupled to each fastener 540 to avoid emitting spurious signals.

FIG. 8 illustrates multiband antenna 800 formed by various features including metal tab 560, metal tab 570, trace 820, and fasteners 540. Antenna 800 in this example has four bent antenna legs formed to simultaneously radiate RF signals at four different resonant RF frequencies. Bent antenna Leg 1 and bent antenna Leg 2 is a DILA and are formed by metal tab 560 that is fed by an RF signal from an RF transceiver (not shown) via antenna feed 640 and a respective portion of trace 820 extending on top surface 840 of board 620. Bent Leg 1 has a length (i.e., total length) configured to radiate at a first frequency f1, and bent Leg 2 has a length (i.e., total length) configured to radiate at a second frequency f2. Bent Leg 3 is formed by metal tab 560 extending from antenna feed 640 to the respective fastener 540, and fastener 540 extending from metal tab 560. Bent Leg 3 has a length (i.e., total length) configured to radiate at a third frequency f3, which third frequency f3 is selectively adjustable and tunable by rotating respective fastener 540 to change respective length L. Bent Leg 4 is formed by metal tab 560, the portion of trace 820 extending between metal tab 560 and metal tab 570, metal tab 570, and length L of the respective fastener 540. Bent Leg 4 has a length (i.e., total length) configured to radiate at a fourth frequency f4. Fourth frequency f4 is selectively adjustable and tunable by rotating respective fastener 540 coupled to metal tab 570 to change respective length L.

A current of the fed RF signal is communicated from antenna feed 640 along each of the legs and the length of the legs determines the radiated frequencies f1, f2, f3 and f4. The total length of both Leg 1 and Leg 2 together provides another radiation mode, called the common mode. As such, with an antenna design shown as multiband antenna 800, multiband antenna 800 is structured to operate in 5 distinct frequency bands, where the length of each Leg 1 and Leg 2 determining a frequency band of operation (frequency f1 and frequency f2) and their total length determining another (frequency f5). Frequency f5 is a lower frequency compared to f1 and f2. This frequency f5 can be adjusted by adjusting length L of fastener 540 associated with metal tab 560. This is commonly done in many consumer electronics devices on the market today to achieve low-cost multiband operation.

The generated resonant RF frequencies are suitable for transmitting and receiving cellular, Wi-Fi, and other signals. In a non-limiting example, frequency f1 may be 6.5 GHZ, frequency f2 may be 5.2 GHZ, frequency f3 may be 7.2 GHZ, and frequency f4 may be 5.8 GHz. The respective fastener 540 forming a portion of bent Leg 3 selectively adjusts f3 between a frequency range of 7.2-7.5 GHZ, which is the end of the Wi-Fi spectrum. The respective fastener 540 forming a portion of bent Leg 4 selectively adjusts f4 between a frequency range of 4.8-5.2 GHz. The signal strength of the radiated frequencies is typically around 13 (decibel-milliwatts) (dBm) and does not create an SAR issue. A lower radiated frequency may be established for frequency f3 or f4 by using a longer length fastener, such as for cellular frequencies.

Figure 9:
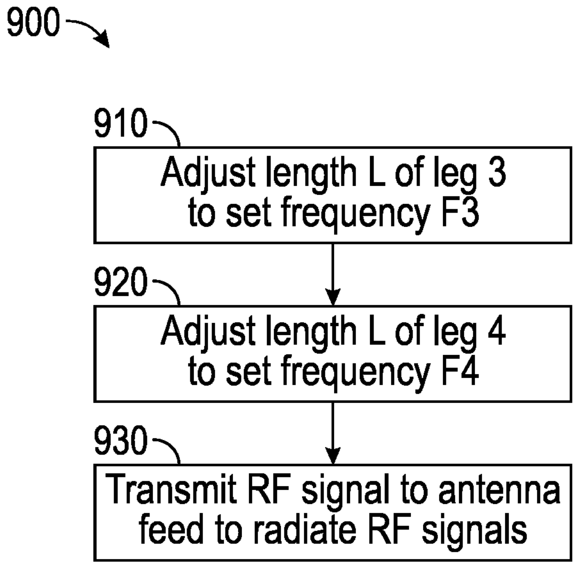
FIG. 9 is a flowchart of a method of operating the multiband antenna.

FIG. 9 is a flowchart 900 of a method of operating multiband antenna 800.

At block 910, the frequency f3 is set. In an example, a user adjusts length L of fastener 540 coupled to metal tab 560 to set frequency f3. Length L is selectively adjusted by rotating the fastener 540 with respect to the screw boss 700, such as with a screwdriver. In an example, frequency f3 is selectable in a frequency range of 7.2-7.5 GHz. A predetermined length L corresponds to a predetermined frequency. In a non-limiting example, if length L is 2 mm then f3 is 7.5 GHz. If length L is 2.5 mm then f3 is 7.4 GHz. If length L is 3.0 mm then f3 is 7.3 GHz. If length L is 3.5 mm then f3 is 7.2 GHz.

At block 920, the frequency f4 is set. In an example, a user adjusts length L of fastener 540 coupled to metal tab 570 to set frequency f4. Length L is selectively adjusted by rotating the fastener with respect to the screw boss 700. In an example, frequency f4 is selectable in a frequency range of 4.8-5.2 GHz. A predetermined length L corresponds to a predetermined frequency. In a non-limiting example, if length L is 2 mm then f4 is 5.2 GHz. If length L is 2.5 mm then f4 is 5.1 GHZ. If length L is 3.0 mm then f4 is 5.0 GHz. If length L is 3.5 mm then f4 is 4.9 GHZ. If length L is 4.0 mm then f4 is 4.8 GHz.

At block 930, an RF signal from a transceiver within temple 500 is coupled to multiband antenna 800 via antenna feed 640. A current of the RF signal is communicated from antenna feed 640 along each of the legs and the length of the legs determines the radiated frequencies f1, f2, f3 and f4, and frequency f5 as discussed above.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A device, comprising:
- a board having an electrical trace;
- a riser coupled to the board and forming a structural component of the device;
- a multiband antenna coupled to the riser and having a first metal tab extending from the riser and a first adjustable member extending from the first metal tab, wherein the first metal tab and the first adjustable member form a first antenna leg configured to radiate a radio frequency (RF) signal at a first frequency; and
- a second metal tab coupled to the riser and having a second adjustable member, wherein the electrical trace extends between the first and second metal tabs, wherein the first metal tab, the second metal tab, and the electrical trace form a second antenna leg configured to radiate an RF signal at a second frequency.

2. The device of claim 1, wherein a length of the first adjustable member determines the first frequency.

3. The device of claim 1, wherein the first antenna leg is a bent leg.

4. The device of claim 2, wherein the first adjustable member is a fastener.

5. The device of claim 4, wherein the fastener is a screw.

6. The device of claim 5, wherein the first metal tab comprises a screw boss configured to receive the screw.

7. The device of claim 4, wherein the fastener is configured to secure the multiband antenna to a housing encompassing the riser.

8. The device of claim 1, wherein the multiband antenna further comprises a third antenna leg configured to radiate an RF signal at a third frequency, and a fourth antenna leg configured to radiate an RF signal at a fourth frequency.

9. The device of claim 8, wherein the first antenna leg, the second antenna leg, the third antenna leg, and the fourth antenna leg are each bent legs.

10. The device of claim 9, wherein the multiband antenna is further configured to radiate an RF signal at a fifth frequency in a common mode.

11. The device of claim 8, wherein an antenna feed is coupled to the first metal tab at a first end, and the electrical trace is coupled to an opposing second end of the first metal tab, wherein the electrical trace electrically couples the first metal tab to the second metal tab.

12. The device of claim 1, wherein the first metal tab and the second metal tab are physically separate from one another.

13. A method of using a device comprising a board having an electrical trace, a riser coupled to the board and forming a structural component of the device, and a multiband antenna coupled to the riser and having a first metal tab extending from the riser and a first adjustable member extending from the first metal tab, wherein the first metal tab and the first adjustable member form a first antenna leg configured to radiate a radio frequency (RF) signal at a first frequency, a second metal tab coupled to the riser and having a second adjustable member, wherein the electrical trace extends between the first and second metal tabs, wherein the first metal tab, the second metal tab, and the electrical trace form a second antenna leg configured to radiate an RF signal at a second frequency, comprising the method of:
- setting a length of the first adjustable member to determine the first frequency;
- energizing the first antenna leg to generate the RF signal at the first frequency;

setting a length of the second adjustable member to determine the second frequency; and energizing the second leg to generate an RF signal at the second frequency.

14. The method of claim 13, wherein the first antenna leg is a bent leg.

15. The method of claim 13, wherein the first adjustable member is a fastener.

16. The method of claim 15, wherein the fastener is a screw.

17. The method of claim 16, wherein the fastener is configured to secure a housing to the multiband antenna.

* * * * *